(12) United States Patent
Laganier et al.

(10) Patent No.: US 8,737,409 B2
(45) Date of Patent: May 27, 2014

(54) MULTIPATH COMMUNICATIONS FOR MOBILE NODE INTERFACES

(75) Inventors: Julien H. Laganier, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 12/892,437

(22) Filed: Sep. 28, 2010

(65) Prior Publication Data

US 2011/0235578 A1    Sep. 29, 2011

Related U.S. Application Data

(60) Provisional application No. 61/248,232, filed on Oct. 2, 2009.

(51) Int. Cl.
*H04L 12/56* (2011.01)

(52) U.S. Cl.
USPC .......................................................... 370/399

(58) Field of Classification Search
None
See application file for complete search history.

(56) References Cited

U.S. PATENT DOCUMENTS

| | | | |
|---|---|---|---|
| 2004/0246939 A1* | 12/2004 | Koskiahde et al. | 370/351 |
| 2006/0018273 A1* | 1/2006 | Yamada et al. | 370/328 |
| 2006/0077932 A1* | 4/2006 | Takeda et al. | 370/331 |
| 2006/0129630 A1* | 6/2006 | Catalina-Gallego et al. | 709/203 |
| 2008/0256220 A1* | 10/2008 | Bachmann et al. | 709/222 |
| 2010/0309899 A1 | 12/2010 | Aso et al. | |

FOREIGN PATENT DOCUMENTS

WO    2009098876 A1    8/2009

OTHER PUBLICATIONS

Ford A et al: "TCP Extensions for Multipath Operation with Multiple Addresses; draft-ford-mptcp-multi addressed-00.txt", TCP Extensions for Multipath Operation With Multiple Addresses; Draft-Ford-MPTCP-Multiaddressed-00.txt, Internet Engineering Task Force, IETF; Standardworkingdraft, Internet Society (ISOC) 4, Rue Des Falaises CH—1205 Geneva, Switzerland, May 7, 2009, XP015062336, [retrieved on May 9, 2009].
International Search Report and Written Opinion—PCT/US2010/051361, International Search Authority—European Patent Office—Dec. 23, 2010.

(Continued)

*Primary Examiner* — Yong Zhou
(74) *Attorney, Agent, or Firm* — Kristine U. Ekwueme

(57) ABSTRACT

Methods and apparatuses are provided that facilitate establishing multiple sub-connections between a correspondent node (CN) and a mobile node (MN), through a home agent (HA) to provide multipath functionality over multiple MN interfaces. The MN can connect to multiple networks using multiple MN interfaces, receiving care-of addresses (CoA) at each network. The MN can establish multiple connections to the CN specifying, to the HA, a different 5-tuple (or n-tuple) for each connection. The different 5-tuple can include a different port number related to a home address assigned by the HA. Also, bindings at the HA can be updated to associate the different 5-tuple with a CoA of one of the multiple MN interfaces. In this regard, the HA can route packets to the MN from the CN based at least in part on determining the HoA port number in the packet associated with the CoA of an MN interface.

20 Claims, 12 Drawing Sheets

(56) References Cited

OTHER PUBLICATIONS

Soliman Elevate Technologies G Tsirtsis Qualcomm N Montavont IT/TB G Giaretta Qualcomm K Kuladinithi University of Bremen H: "Flow Bindings in Mobile IPv6 and NEMO Basic Support; draft-ietf-mext-flow-bindi ng-03.txt", Flow Bindings in Mobile IPV6 and Nemo Basic Support; Draft-IETF-Mext-Flow-Binding-03.txt, Internet Engineering Task Force, IETF; Standardworkingdraft, Internet Society (ISOC) 4, Ruedes Falaises CH—1205 Geneva, Switzerland, vol. mext, No. 3, Jul. 13, 2009, XP015063459, [retrieved on Jul. 13, 2009].

Wakikawa (ED) Toyota ITC V Devarapalli Wichorus G Tsirtsis Qualcomm T Ernst Inria K Nagami Intec Netcore R: "Multiple Care-of Addresses Registration; draft-ietf-monami6-multiplec oa-14.txt", Multiple Care-of Addresses Registration; Draft-IETF-M0NAMI6-Multiple 0A-14.txt, Internet Engineering Task Force, IETF; Standardworkingdraft, Internet Society (ISOC) 4, Rue Des Falaises CH—1205 Geneva, Switzerland, vol. monami6, No. 14, May 27, 2009, XP015062543, [retrieved on May 27, 2009].

Zhao X, et al., "Flexible Network Support for Mobility", MOBICOM '98. Proceedings of the 4th Annual ACM/IEEE International Conference on Mobile Computing and Networking. Dallas, TX, Oct. 25-30, 1998; [Annual ACM/IEEE International Conference on Mobile Computing and Networking], New York, NY : ACM, US, Oct. 25, 1998, pp. 145-156, XP000850264, DOI: DOI:10.1145/288235. 288274 ISBN: 978-1-58113-035-5.

Bagnulo et al., "Boosting mobility performance with Multi-Path TCP", Future Network and Mobile Summit 2010, Jun. 2010, URL,http://nes.aueb.gr/publications/MPTCP_mobility_mobile_summit_2010.pdf.

Taiwan Search Report—TW099133720—TIPO—Jun. 18, 2013.

\* cited by examiner

MULTIPATH COMMUNICATIONS FOR MOBILE NODE INTERFACES

CLAIM OF PRIORITY UNDER 35 U.S.C. §119

The present Application for patent claims priority to Provisional Application No. 61/248,232 entitled "METHODS AND APPARATUS FOR MULTIPATH TCP RESOURCE POOLING," filed Oct. 2, 2009, and assigned to the assignee hereof and hereby expressly incorporated by reference herein.

BACKGROUND

1. Field

The following description relates generally to wireless communications, and more particularly to multipath communications for mobile node interfaces.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, for example, a device can connect to a home agent (HA) of a wireless network through the base station using a mobile internet protocol (MIP). In MIP, for example, the HA can assign a home address (HoA) to the device for allowing communication with the device. In addition, for example, the base station with which the device communicates can belong to a visited network that does not include the HA. In this example, the device can receive a care-of address (CoA) for communicating in the visited network, and the HA can bind the CoA to the HoA, such that packets received for the device at the HA can be routed to the device through the visited network using the CoA. Some MIP implementations, however, hide the CoA address from upper layer protocols, since the address can be modified as the device moves between base stations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating establishing a multipath connection comprising a plurality of sub-connections to a correspondent node (CN) in mobile communications protocols. In an example, a mobile node (MN) can initialize the sub-connections through a home agent (HA) or similar routing entity using at least a portion of a plurality of MN interfaces. For example, the MN interfaces can each connect to one or more visited networks, which can assign care-of addresses (CoA) to the respective MN interface for communicating in the visited network. The MN can establish sub-connections to the CN through the HA (e.g., related to a home address assigned by the HA) over each of the MN interfaces such that the sub-connections can be routed to/from the MN interfaces. In this regard, the HA can bind each of the CoA addresses of the MN interfaces to parameters regarding the sub-connections (e.g., addresses, port numbers, etc. of the HA or CN, other parameters in a 5-tuple, and/or the like) to facilitate such routing.

According to an example, a method of wireless communication is provided that includes initializing a sub-connection through a HA for communicating with a CN over a MN interface and establishing a different sub-connection through the HA for communicating with the CN over a different MN interface, wherein the sub-connection and the different sub-connection form a multipath connection.

In another aspect, a wireless communications apparatus for establishing multiple sub-connections in a mobile communication protocol is provided that includes at least one processor configured to initialize a sub-connection through a HA for communicating with a CN over a mobile node interface. The at least one processor is further configured to establish a different sub-connection through the HA for communicating with the different mobile node interface, wherein the sub-connection and the different sub-connection form a multipath connection. In addition, the wireless communications apparatus includes a memory coupled to the at least one processor.

In yet another aspect, an apparatus for establishing multiple protocol sub-connections is provided that includes means for configuring a plurality of sub-connections with a CN through a HA. The apparatus further includes means for requesting establishment of the plurality of sub-connections with the CN at least in part by specifying a different 5-tuple for each of the plurality of sub-connections.

Still, in another aspect, a computer-program product is provided for establishing multiple sub-connections in a mobile communication protocol that includes a computer-readable medium having code for causing at least one computer to initialize a sub-connection through a HA for communicating with a CN over a mobile node interface. The computer-readable medium further includes code for causing the at least one computer to establish a different sub-connection through the HA for communicating with the different mobile node interface, wherein the sub-connection and the different sub-connection form a multipath connection.

Moreover, in an aspect, an apparatus for initializing multiple protocol sub-connections in a wireless network is provided that includes a sub-connection configuring component for defining one or more parameters related to configuring a plurality of sub-connections with a CN through a HA. The apparatus further includes a sub-connection establishing component for requesting establishment of the plurality of sub-connections with the CN at least in part by specifying a different 5-tuple for each of the plurality of sub-connections.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
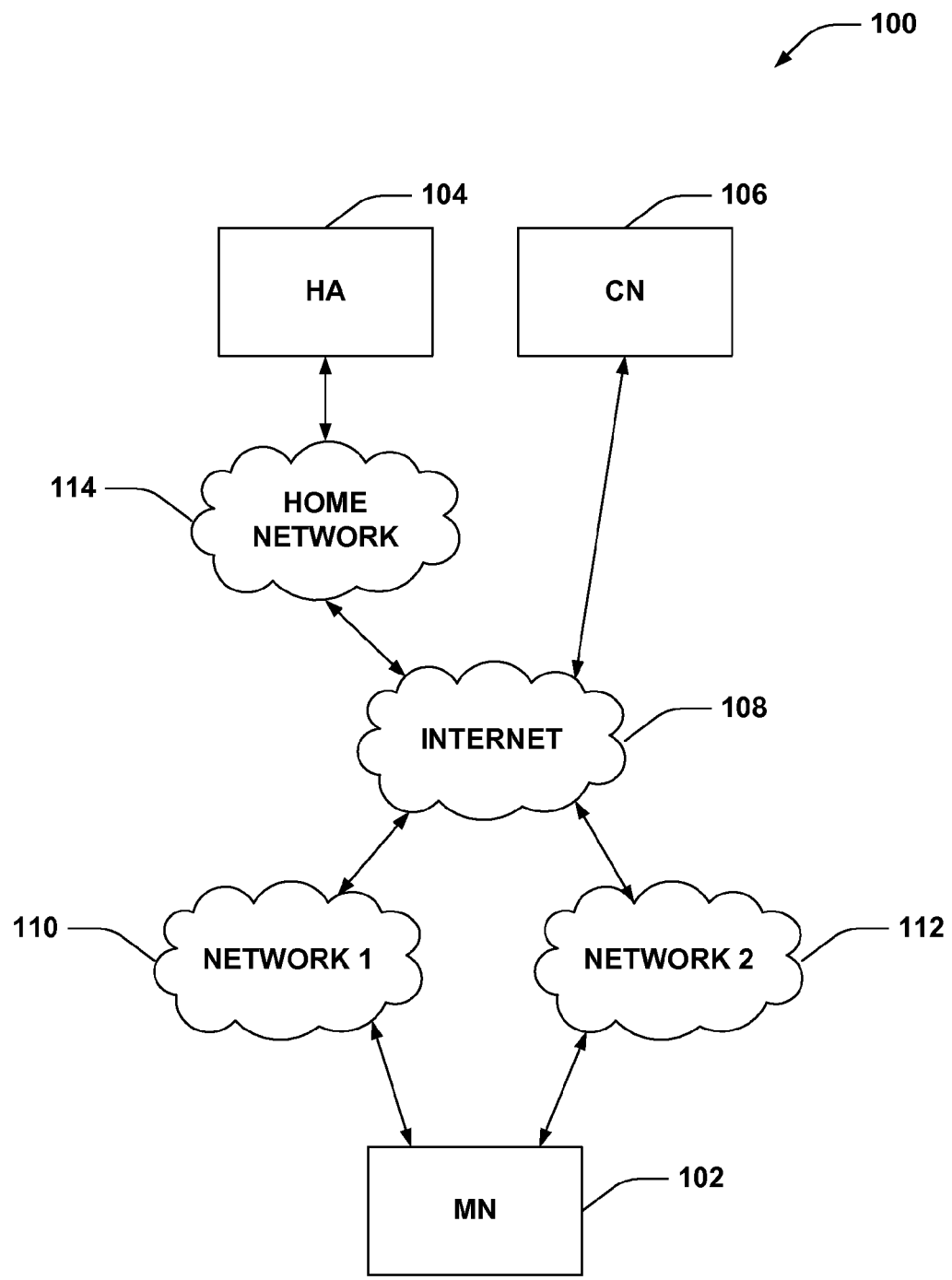
FIG. 1 illustrates an example system for communicating over multiple networks to provide mobile node (MN) access to one or more correspondent nodes (CN).

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a mobile node (MN) can establish multiple sub-connections for a multipath connection. For example, the MN can utilize a plurality of MN interfaces, which can each connect to similar or distinct networks, for communicating with a correspondent node (CN). In this regard, the MN can pool resources of the MN interfaces to increase data throughput when communicating with the CN. The MN can inform a home agent (HA) of care-of addresses (CoA) provided to the MN interfaces for communicating in one or more visited networks. In addition, the MN can establish sub-connections to the CN over at least a portion of the MN interfaces through the HA.

In this regard, the MN can select parameters for the multiple sub-connections for indicating to the HA in a binding update, such as a 5-tuple (or n-tuple, where n is a positive integer) distinct for each sub-connection, and the HA can bind parameters regarding the sub-connections to the CoA addresses of the MN interfaces. In one example, the MN can select different port numbers related to a home address (HoA) assigned to the MN for the sub-connections. In this regard, the HA can identify packets from the CN for communicating to the MN based at least in part on determining a CoA address that corresponds to the HoA port number in the packets. Additionally, for example, the MN can communicate a number of available MN interfaces to the CN, which can request setup of the sub-connections from the MN based at least in part on the number of available MN interfaces.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates communicating in multiple networks. System 100 includes a MN 102 that can communicate with a HA 104 and CN 106 over one or more networks. For example, as shown, MN 102 can communicate over an internet 108 via network 1 110 and/or network 2 112. Similarly, HA 104 can communicate with the internet 108 over home network 114, and CN 106 can communicate with the internet 108 directly, using a different network, and/or the like. For example, the MN 102 can be a mobile device, UE, modem (or other tethered device), and/or the like, that communicates with one or more base stations or other components of network 1 110 and/or network 2 112. Similarly, CN 106 can be substantially any node that can communicate over the internet 108 and interface with an MN. In addition, for example, the home network 114 can relate to a service provider of the MN 102, and can manage access to/from MN 102.

According to an example, MN 102 can communicate with network 1 110 and network 2 112 over different mobile node interfaces. For example, one mobile node interface can be a 3GPP or other cellular interface, another mobile node interface can be a WiFi interface, and/or the like. In addition, MN 102 can additionally or alternatively connect to network 1 110 over multiple interfaces. In one example, MN 102 can include mobile node interfaces of the same type. In any case, network 1 110 and/or network 2 112 can assign a CoA, which can be an internet protocol (IP), mobile IP (MIP), or similar address, to the mobile node interfaces connected thereto. Thus, network 1 110 and/or network 2 112 can utilize the CoAs to route communications to the MN 102 over the respective mobile node interface. In addition, MN 102 can communicate with HA 104 using network 1 110 and/or network 2 112 through the internet 108. As described, HA 104 can assign a home address (HoA) to MN 102 to provide a mobility anchor such that remote applications or nodes, such as CN 106, can utilize the HoA to communicate with MN 102 through HA 104.

Thus, for example, MN 102 can establish a sub-connection to CN 106 through HA 104. In this example, MN 102 can establish the sub-connection over the MN interface that connects to network 1 110 through HA 104. In this example, HA 104 can bind parameters of the sub-connection to a CoA address of the MN interface. In one example, the parameters of the sub-connection can relate to a port number of the HoA (e.g., which can be selected by MN 102), an address of the CN, a port number related to the CN address, and/or the like. In this regard, HA 104 can appropriately route packets between MN 102 and CN 106 over the sub-connections.

In one example, upon establishing the sub-connection with CN 106, MN 102 can communicate a binding update to HA 104 that specifies the port number of the HoA. The HA 104 can accordingly bind the HoA and port number to the CoA of the related MN interface (which can be determined by the HA 104 during receiving the binding update, specified as part of the binding update, and/or the like). In addition, HA 104 can associate an address of the CN 106 and/or related port number with the CoA as well. In this regard, upon receiving packets from the CN 106 that specify the HoA and port number, HA 104 can determine the related CoA address and transmit the packets to the corresponding MN interface of MN 102 using the CoA address. Moreover, in an example, HA 104 can also map the packets to the CoA based in part on the CN address and/or port number.

In this regard, MN 102 can establish additional sub-connections to CN 106 using alternate port numbers. For example, MN 102 can establish a sub-connection to CN 106 over the MN interface that connects to network 2 112 through HA 104. In this example, as described, MN 102 can send a binding update to HA 104 that includes the alternate port number of the HoA to associate to this additional sub-connection, and HA 104 can bind the port number and/or other parameters (e.g., CN 106 address and port number) to the CoA of the MN interface that connects to network 2 112. Thus, HA 104 can similarly route packets received from CN 106 with the alternate port number to the MN interface that connections to network 2 112 using the corresponding CoA. In this regard, HA 104 can manage multiple sub-connections between MN 102 and CN 106 allowing resource pooling therebetween, which can increase throughput. In one example, the sub-connections can be part of a multipath connection between MN 102 and CN 106.

Figure 2:
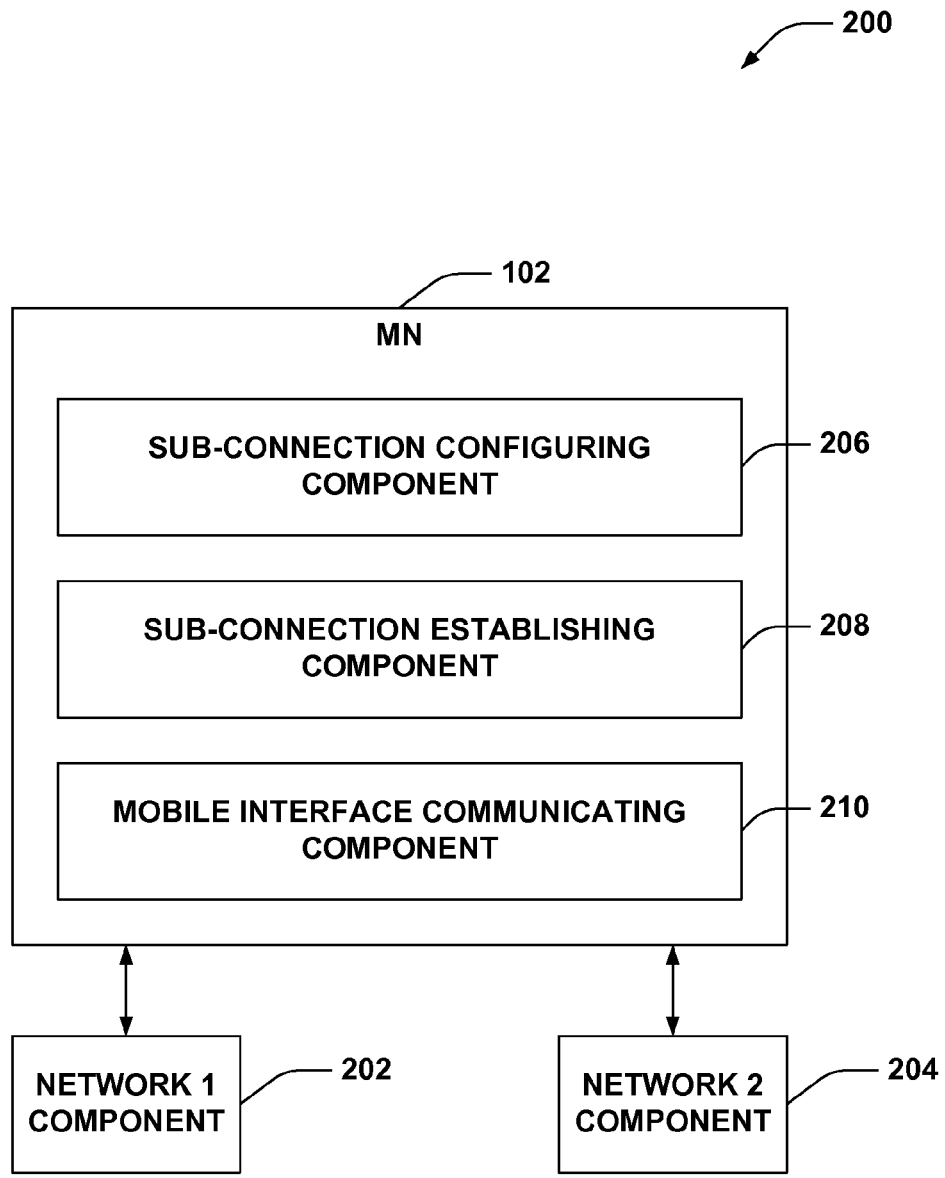
FIG. 2 illustrates an example system for establishing multiple sub-connections with a CN.

Turning to FIG. 2, illustrated is an example wireless communications system 200 that facilitates connecting to a CN using a plurality of sub-connections over multiple MN interfaces. System 200 includes a MN 102, which as described can communicate over a plurality of networks using a MN interface for communicating in each network. System 200 also comprises a network 1 component 202 and network 2 component 204, which can respectively provide MN 102 with access to network 1 and network 2. Network 1 component 202 and network 2 component 204 can each be a base station (e.g., macrocell, femtocell, picocell, etc.), WiFi hotspot, or other device that allows access to network 1 and network 2, respectively. MN 102 comprises a sub-connection configuring component 206 that determines one or more parameters for establishing a sub-connection with a CN, a sub-connection establishing component 208 that initializes the sub-connection to the CN, and a mobile interface communicating component 210 that establishes a connection to one or more networks to communicate with the CN.

According to an example, mobile interface communicating component 210 can establish connections with network 1 component 202 and network 2 component 204 to communicate in the associated networks. Mobile interface communicating component 210 can receive a CoA address from each of network 1 component 202 and network 2 component 204 for communicating therewith over respective MN interfaces. In addition, as described, MN 102 can notify an HA (not shown), to which MN 102 communicates through network 1, network 2, and/or another network, of the CoAs, for example. Sub-connection configuration component 206 can obtain one or more parameters for requesting a sub-connection to a CN (not shown) through network 1 component 202, for instance. In one example, sub-connection configuring component 206 can select or otherwise receive (e.g., from a configuration, hardcoding, specification, etc.) a port number for associating to the CN.

As described, for example, the port number can correspond to a HoA assigned to the MN 102 for identifying packets to be routed to the MN 102. In one example, sub-connection configuring component 206 can select the port number according to a sequence, a random or pseudo random (e.g., based on an identifier of the MN 102) pattern, and/or the like. Sub-connection establishing component 208 can initialize the sub-connection with the CN through the HA specifying a 5-tuple (or n-tuple), which can include the HoA and port number to the CN (e.g., using the mobile interface communicating component 210 to communicate over network 1), the CN address, and a related port number for the CN address. A 5-tuple or n-tuple can relate to a set of elements corresponding to one or more packets. Sub-connection configuring component 206 can additionally transmit a binding update to the HA including the port number, so the HA can associate communications from the CN received over the port number with the CoA received from network 1 component 202, as described.

In addition, sub-connection configuring component 206 can obtain one or more parameters for requesting another sub-connection with CN through network 2 component 204. Thus, this sub-connection can relate to a different MN interface having a different CoA. Moreover, for example, sub-connection configuring component 206 can specify a different 5-tuple for establishing this sub-connection. For example, sub-connection configuring component 206 can select a different port number for associating to the CN. The different port number, again, can correlate to the HoA. In this example, sub-connection establishing component 208 can initialize this sub-connection with the CN through the HA as well, specifying the HoA and the different port number of the CN (e.g., using the mobile interface communicating component 210 to communicate over network 2).

Moreover, sub-connection configuring component 206 can transmit a binding update to the HA including the different port number, so the HA can associate communications from the CN received over the different port number with the different CoA received from network 2 component 204. In this regard, MN 102 can communicate with the CN over different sub-connections that connect to network 1 component 202 and/or network 2 component 204 over different MN interfaces. MN 102 can pool resources of the sub-connections to increase data throughput. Thus, for example, mobile interface communicating component 210 can receive packets over the sub-connections and provide the packets to an application at the MN 102 to provide multipath functionality.

Figure 3:
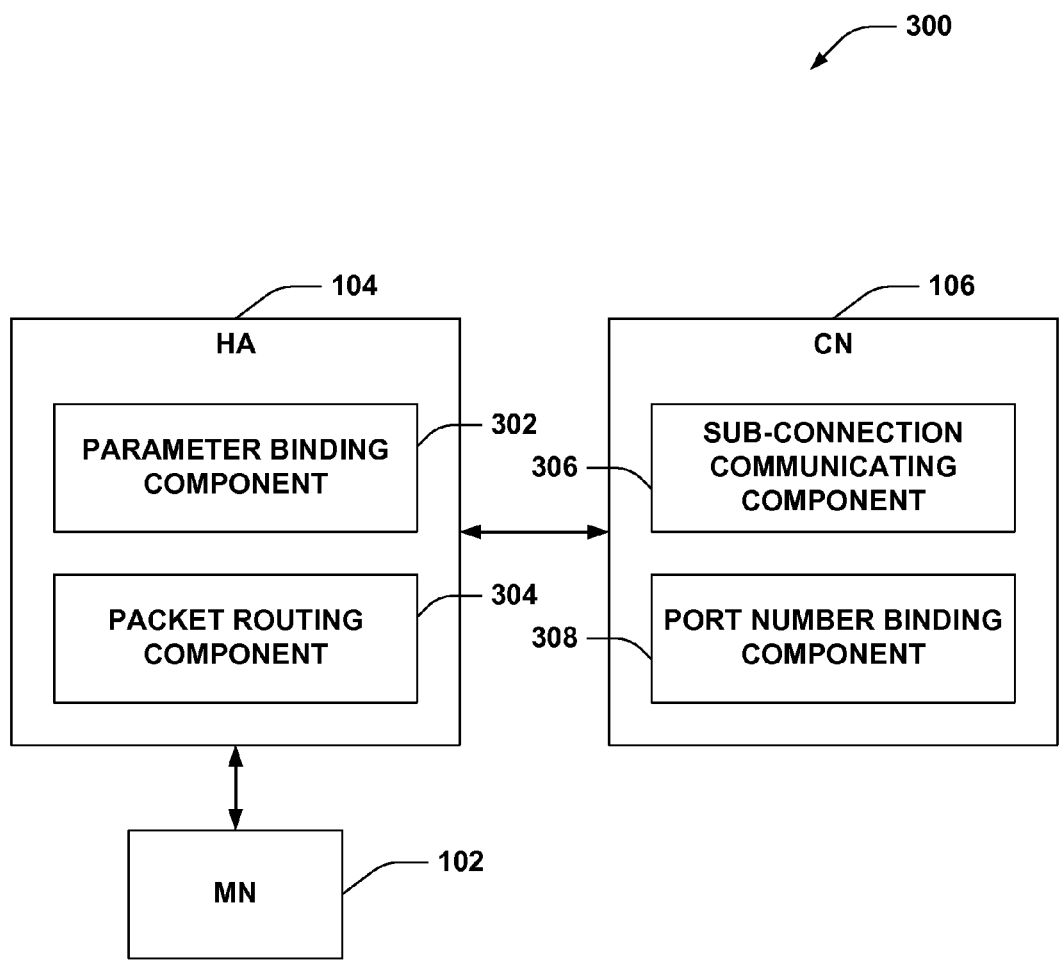
FIG. 3 illustrates an example system that facilitates routing packets to an MN based at least in part on binding communications parameters to an address.

Referring to FIG. 3, illustrated is an example wireless communications system 300 that facilitates communicating with a CN over a mobile protocol using multiple sub-connections. System 300 includes a MN 102, which as described can communicate with an HA 104 to access one or more other nodes, such as CN 106. Though not shown, it is to be appreciated that MN 102 can communicate with HA 104 and CN 106 (through HA 104) over various networks, as described previously, such that the HA 104 is a mobility anchor for MN 102. Indeed, the depicted links are intended to represent logical communication paths, and not necessarily physical links, between the MN 102, HA 104, and CN 106. HA 104 comprises a parameter binding component 302 that associates one or more received communications parameters with a CoA for routing packets to a related MN interface, and a packet routing component 304 that so routes the packets. CN 106 includes a sub-connection communicating component 306 that initializes a sub-connection with an MN, and a port number binding component 308 that associates the sub-connection with a port number received for communicating over the sub-connection.

According to an example, as described, MN 102 can establish a connection to HA 104, and can receive a corresponding HoA for communicating with and receiving communications from HA 104. Moreover, MN 102 can establish a sub-connection with CN 106 through HA 104. Thus, sub-connection communicating component 306 can receive a request or other message to establish the sub-connection with MN 102 from HA 104. In one example, the sub-connection request or message can include a port number of the HoA, or a different portion of a related 5-tuple that can be used to distinguish sub-connections. Port number binding component 308 can associate the port number (or disparate portion of the 5-tuple, etc.) with the sub-connection. In one example, port number binding component 308 can associate the port number of the HoA with an address or port number for the CN 106 related to the sub-connection (e.g., in a routing table). In this regard, sub-connection communicating component 306 can transmit packets over the sub-connection by transmitting the packets to the HA 104 using the HoA and port number (e.g., by determining the HoA and port number from the routing table based on one or more parameters of the sub-connection). Thus, for example, for packets received over a given address or port number of CN 106, sub-connection communicating component 306 can transmit response packets over the corresponding HoA and port number associated to given address or port number of CN 106 by port number binding component 308.

Similarly, for example, parameter binding component 302 can associate the port number (or disparate portion of the 5-tuple) to a CoA of the MN 102 utilized for establishing the sub-connection with CN 106. It is to be appreciated, for example, that HA 104 can discern such parameters from the sub-connection establishment request from MN 102 and/or can receive the parameters in a binding update from MN 102. In the latter case, parameter binding component 302 can transmit a binding acknowledgement to MN 102 after associating the parameters to the CoA. In this regard, upon receiving packets from CN 106 over the port number related to the HoA, packet routing component 304 can forward the packets to MN 102 over the appropriate MN interface based at least in part on determining the CoA related to the port number (or other 5-tuple portion), as described.

Thus, in this example, sub-connection communicating component 306 can similarly receive additional sub-connection establishment requests from MN 102 for other sub-connections using different port numbers of the same HoA. Similarly, as described, port number binding component 308 can associate the different port numbers with an address or port number of CN related to the additional sub-connections. Also, parameter binding component 302 can similarly bind the different port numbers to related CoAs, as described, for routing packets to the MN 102 over the corresponding MN interface. In this regard, MN 102 can establish multiple sub-connections with CN 106, and sub-connection communicating component 306 can transmit packets over the multiple sub-connections at least in part by utilizing a corresponding HoA port number. For example, the HA 104 can thus initialize one traffic selector per sub-connection (e.g., based on a different port number) to separately route the sub-connections over the MN interface bound to the HoA port number. It is to be appreciated that HAs can currently associate 5-tuples to CoAs; thus, HAs may not require modification to implement the functionality described herein, where MN 102 presents a different 5-tuple (e.g., with different HoA port numbers) to the HA for binding to a distinct MN interface.

Figure 4:
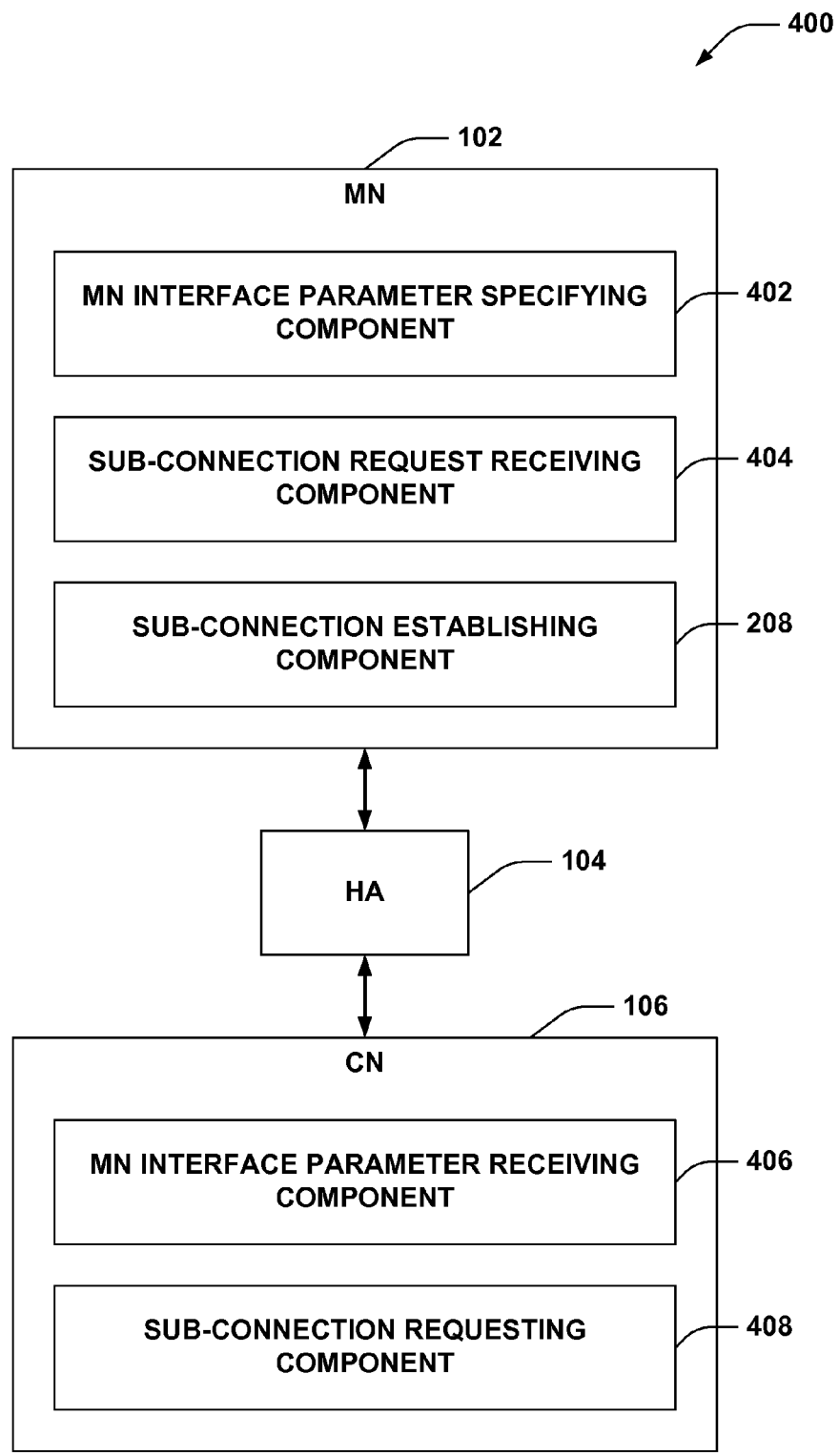
FIG. 4 illustrates an example system for establishing a plurality of sub-connections based at least in part on a received request to establish a sub-connection.

Turning now to FIG. 4, an example wireless communications system 400 that requests sub-connections from an MN is depicted. System 400 includes an MN 102 that communicates with a CN 106 through an HA 104, as described. MN 102 can comprise a MN interface parameter specifying component 402 that provides one or more parameters regarding one or more MN interfaces of MN 102 to a CN, a sub-connection request receiving component 404 that obtains a request for establishing one or more sub-connections from a CN, and a sub-connection establishing component 208 that initializes one or more sub-connections with a CN. CN 106 comprises a MN interface parameter receiving component 406 that obtains one or more parameters regarding one or more MN interfaces from a MN, and a sub-connection requesting component 408 that transmits a request to an MN to establish one or more sub-connections.

According to an example, as described, MN 102 can communicate with HA 104 (e.g., through one or more networks and over one or more MN interfaces), such that HA 104 can provide a mobility anchor for communicating with MN 102. In addition, MN 102 can establish a connection (or one or more sub-connections) with CN 106 through HA 104, as described. In an example, MN interface parameter specifying component 402 can signal or otherwise indicate one or more parameters regarding one or more MN interfaces of MN 102 to CN 106. For example, this can be a number of MN interfaces available for communicating at MN 102. MN interface parameter receiving component 406 can obtain the one or more parameters, and sub-connection requesting component 408 can transmit a request to establish one or more sub-connections to MN 102 based at least in part on the one or more parameters. For example, where the one or more parameters relates to a number of MN interfaces at MN 102, CN 106 can transmit a request to establish sub-connections over one or more of the number of MN interfaces.

In this example, sub-connection request receiving component 404 can obtain a request to establish one or more sub-connections from CN 106. In this regard, sub-connection establishing component 208 can initialize one or more sub-connections with CN 106 based at least in part on the request. For example, as described, sub-connection establishing component 208 can transmit the sub-connection establishment with port numbers (or other portions of a related 5-tuple) that are distinct for a given MN address, such that HA 104 can route packets received over the port numbers to the appropriate CoA address, as described. In addition, as described, the one or more sub-connections for which establishment is requested can be part of a multipath connection between MN 102 and CN 106 to increase throughput of the connection.

Figure 5:
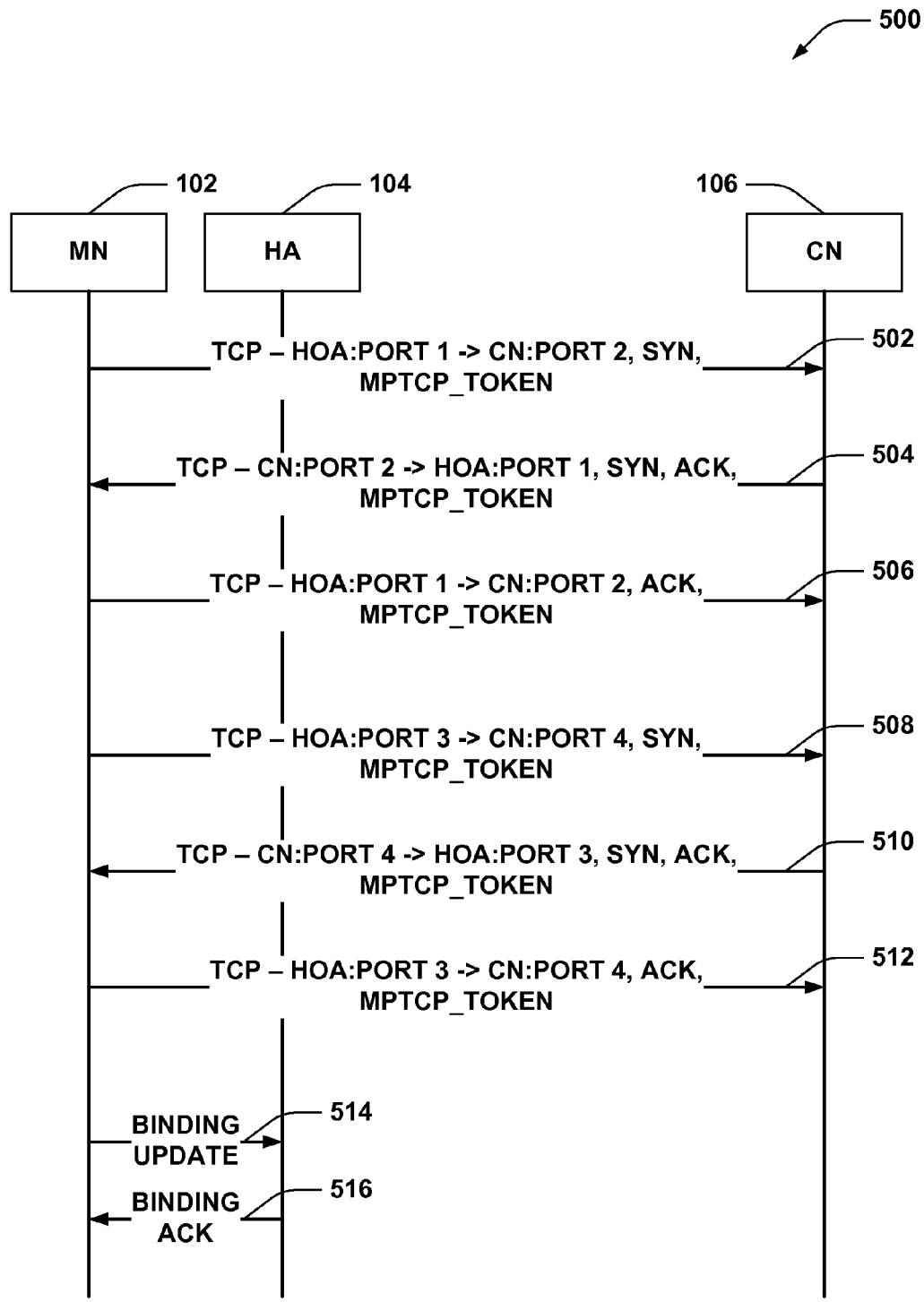
FIG. 5 illustrates an example system for initializing multiple sub-connections with a CN.

Turning to FIG. 5, an example wireless communication system 500 is shown for establishing multiple sub-connections using a mobile communications protocol. System 500 includes a MN 102 that communicates with an HA 104, as described, to access a wireless network or one or more nodes or services thereof, such as CN 106. As shown, MN 102 can transmit a sub-connection establishment request 502 to CN 106 through HA 104 that specifies an HoA and port 1, the CN 106 address and port 2, a SYN cookie (e.g., initial TCP sequence numbers to avoid flood attacks), and a multipath transmission control protocol (MPTCP) token, which can indicate that the MN 102 can establish multipath connections. CN 106 can establish the connection with MN 102 through HA 104 and can transmit an acknowledgement 504 to the MN 102, which similarly includes the CN address and port 2 (or a disparate port number, for example where port 2 is utilized or otherwise unavailable), the HoA and port 1, the SYN cookie, an acknowledgement indicator (which can be a non-acknowledge, in one example), and the MPTCP token, which indicates the CN 106 can establish multipath connections as well. MN 102 can further transmit an acknowledgement 506 back to CN 106 through HA 104 that includes the HoA and port 1, the CN address and port 2 (or another port if specified in acknowledgement 504), an acknowledgement indicator, and the MPTCP token.

In addition, MN 102 can establish another sub-connection to CN 106, as described. Thus, MN 102 can transmit a sub-connection establishment request 508 to CN 106 through HA 104. The sub-connection establishment request 508 can include the HoA and port 3, the address of CN 106 and port 4, a SYN cookie, which can be different from the previous SYN cookie, and the MPTCP token. CN 106 can establish the connection and respond with an acknowledgement 510 including the CN address and port 4 (or a different port number, as described), the HoA and port 3, the SYN cookie, an acknowledgement indicator, and the MPTCP token. Again, MN 102 can acknowledge receiving the acknowledgement with acknowledgment 512, which can include the HoA and port 3, the CN address and received port number, an acknowledgement indicator, and the MPTCP token. MN 102 can establish sub-connections, in this regard, using different HoA port numbers, as described, for at least a portion of MN interfaces available at MN 102.

Moreover, for example, MN 102 can transmit a binding update 514 to HA that includes the HoA port numbers related to the sub-connections. In one example MN 102 can transmit a binding update 514 related to a given sub-connection over the MN interface for that sub-connection, and HA 104 can determine the related CoA of the MN interface. In another example, MN 102 can include the CoA in the binding update 514. Moreover, for example, the binding update 514 can include the address of the CN 106, the port number, and/or the like. In another example, HA 104 can associate the CN address and/or port number with the HoA port number upon receiving a sub-connection establishment request (e.g., 502 or 508) or acknowledgement (e.g., 504, 506, 510, or 512) for forwarding to CN 106 or MN 102. In any case, HA 104 can transmit a binding acknowledgement 516 to MN 102, at which point MN 102 can initiate communications to CN 106 over the sub-connection(s) in the binding update 514, for example. Subsequently, as described, HA 104 can route packets from CN 106 to MN 102 over the appropriate MN interface based at least in part on the HoA port number.

Figure 6:
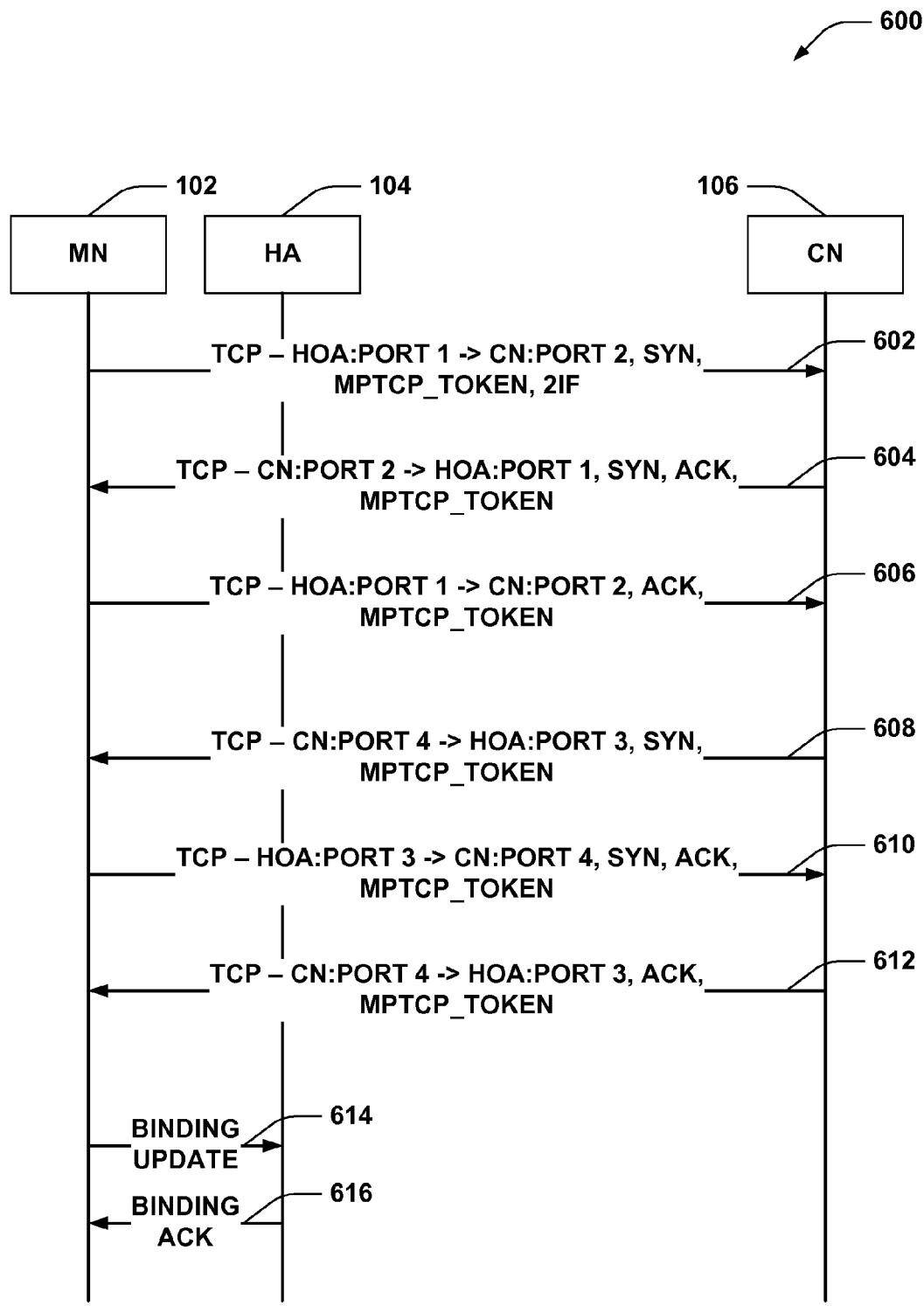
FIG. 6 illustrates an example system for receiving a request to establish a sub-connection from a CN.

Turning to FIG. 6, an example wireless communication system 600 is illustrated that facilitates requesting sub-connection establishment from an MN. System 600 can include a MN 102 that communicates with an HA 104, as described, to access a wireless network or one or more nodes or services thereof, such as CN 106. As shown and described, MN 102 can transmit a sub-connection establishment request 602 to CN 106 through HA 104 that specifies an HoA and port 1, the CN 106 address and port 2, a SYN cookie (e.g., initial TCP sequence numbers to avoid flood attacks), and a multipath transmission control protocol (MPTCP) token, which can indicate that the MN 102 can establish multipath connections, along with a parameter that specifies MN 102 has 2 interfaces (2IF). CN 106 can establish the connection with MN 102 through HA 104 and can transmit an acknowledgement 604 to the MN 102, which similarly includes the CN address and port 2 (or a disparate port number, for example where port 2 is utilized or otherwise unavailable), the HoA and port 1, the SYN cookie, an acknowledgement indicator (which can be a non-acknowledge, in one example), and the MPTCP token, which indicates the CN 106 can establish multipath connections as well. MN 102 can further transmit an acknowledgement 606 back to CN 106 through HA 104 that includes the HoA and port 1, the CN address and port 2 (or another port if specified in acknowledgement 604), an acknowledgement indicator, and the MPTCP token.

Based at least in part on receiving the 2IF in the sub-connection establishment request 602, CN 106 can request an additional sub-connection with MN 102. Thus, CN 106 can transmit a sub-connection establishment request 608 to MN 102 through HA 104. The sub-connection establishment request 608 can specify the address of CN 106 as well as port 4, the HoA and port 3, a SYN cookie, and the MPTCP token. MN 102 can establish the sub-connection responding with acknowledgement 610, which includes the HoA and port number 3 (or another port number where port 3 is not available), the CN address and port 4, the SYN cookie, an acknowledgement indicator, and the MPTCP token. Similarly, CN 106 can acknowledge receiving the acknowledgement by transmitting acknowledgement 612 to MN 102 through HA 104, which can include the CN address and port 4, the HoA and port 3 (or different port as specified in acknowledgement 610), an acknowledgement indicator, and the MPTCP token. Similarly, in this example, MN 102 can transmit a binding update 614 to HA 104, or HA 104 can otherwise determine the bindings based on the other messages, as described. Moreover, as described, HA 104 can transmit a binding acknowledgement 616 to MN 102.

Figure 7:
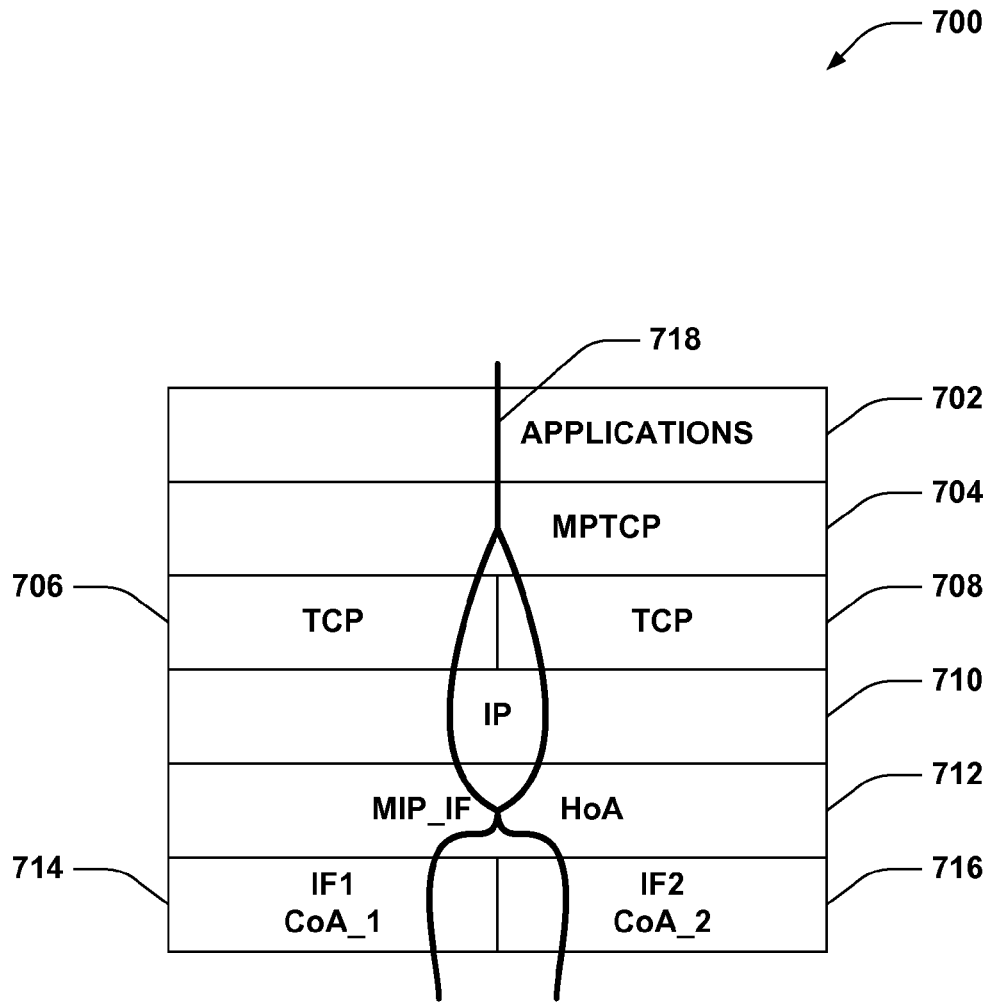
FIG. 7 illustrates an example protocol stack relating to aspects described herein.

Referring to FIG. 7, an example protocol stack 700 is depicted in accordance with aspects described herein. Protocol stack 700 includes an applications layer 702 that can utilize an MPTCP layer 704 to implement a MPTCP connection over multiple sub-connections, as described. MPTCP layer can pool TCP layers 706 and 708, which can each correspond to an MN interface connection with the CN, as described. TCP layers 706 and 708 can utilize an IP layer 710 to manage IP connections for the MN interface connections. IP layer 710 can utilize an MIP interface (MIP_IF) related to the HoA received from an HA to access MN interface 1 (IF1) 714 and MN interface 2 (IF2) 716, which can respectively be assigned CoA 1 and CoA 2 (e.g., by one or more networks), as described. In this regard, packets can flow, as shown by line 718, from the applications layer 702 through the MPTCP layer 704, which manages TCP connections 706 and 708. Based at least in part on a destination address or port number specified in the packet, MPTCP layer 704 can forward the packet over TCP layer 706 or 708. In either case, the packet can reach IP layer 710, which can manage the MIP_IF layer 712 based on the HoA assigned by the HA. The MIP_IF layer 712 can utilize flow binding to enable the different sub-connections over IF1 714 and IF2 716. Based at least in part on the destination address or port number, MIP_IF layer 712 can determine whether to forward the packer over IF1 714 or IF2 716. IF1 layer 714 or IF2 layer 716 can transmit the packet over the corresponding MN interface, and can include the corresponding HoA port number in the packet, as described.

Figure 8:
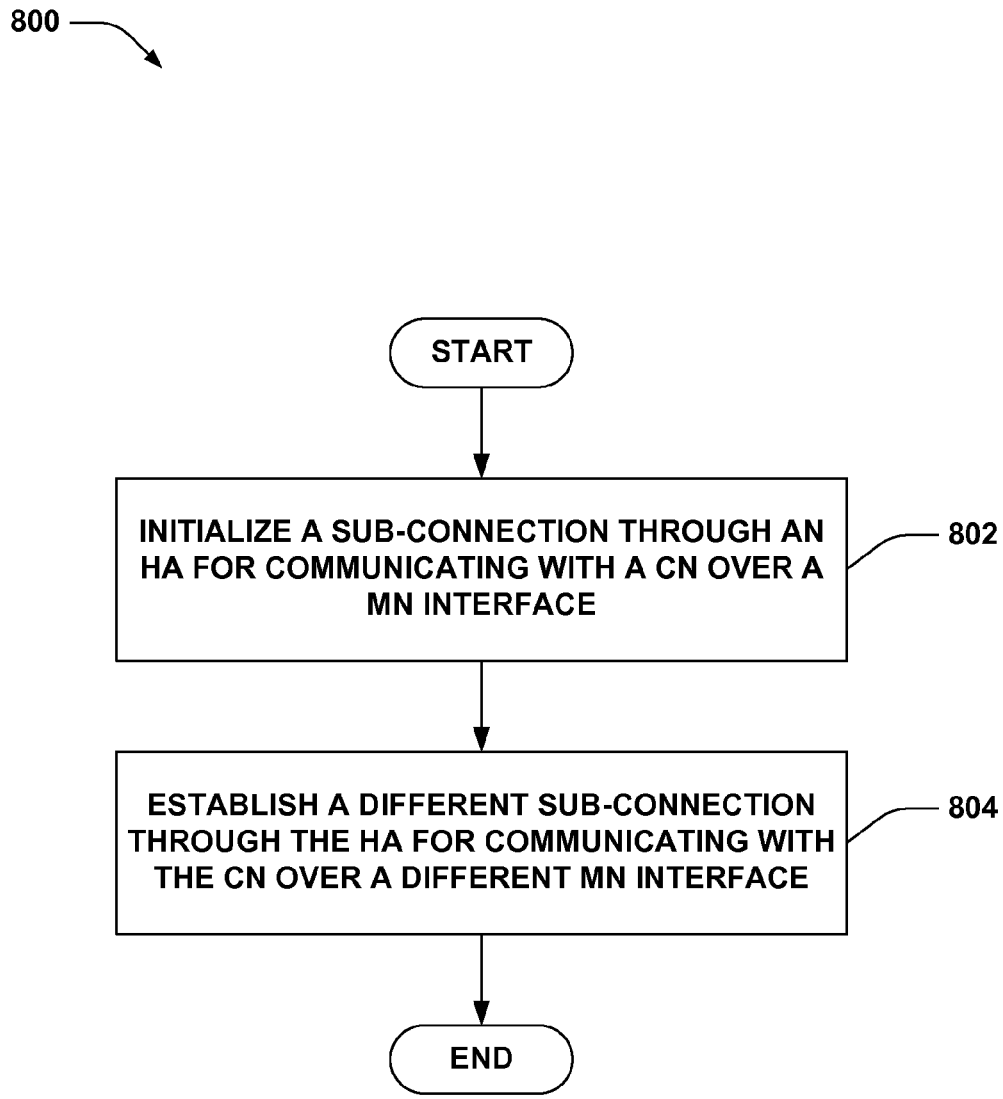
FIG. 8 illustrates an example methodology that facilitates establishing multiple sub-connections with a CN.
Figure 9:
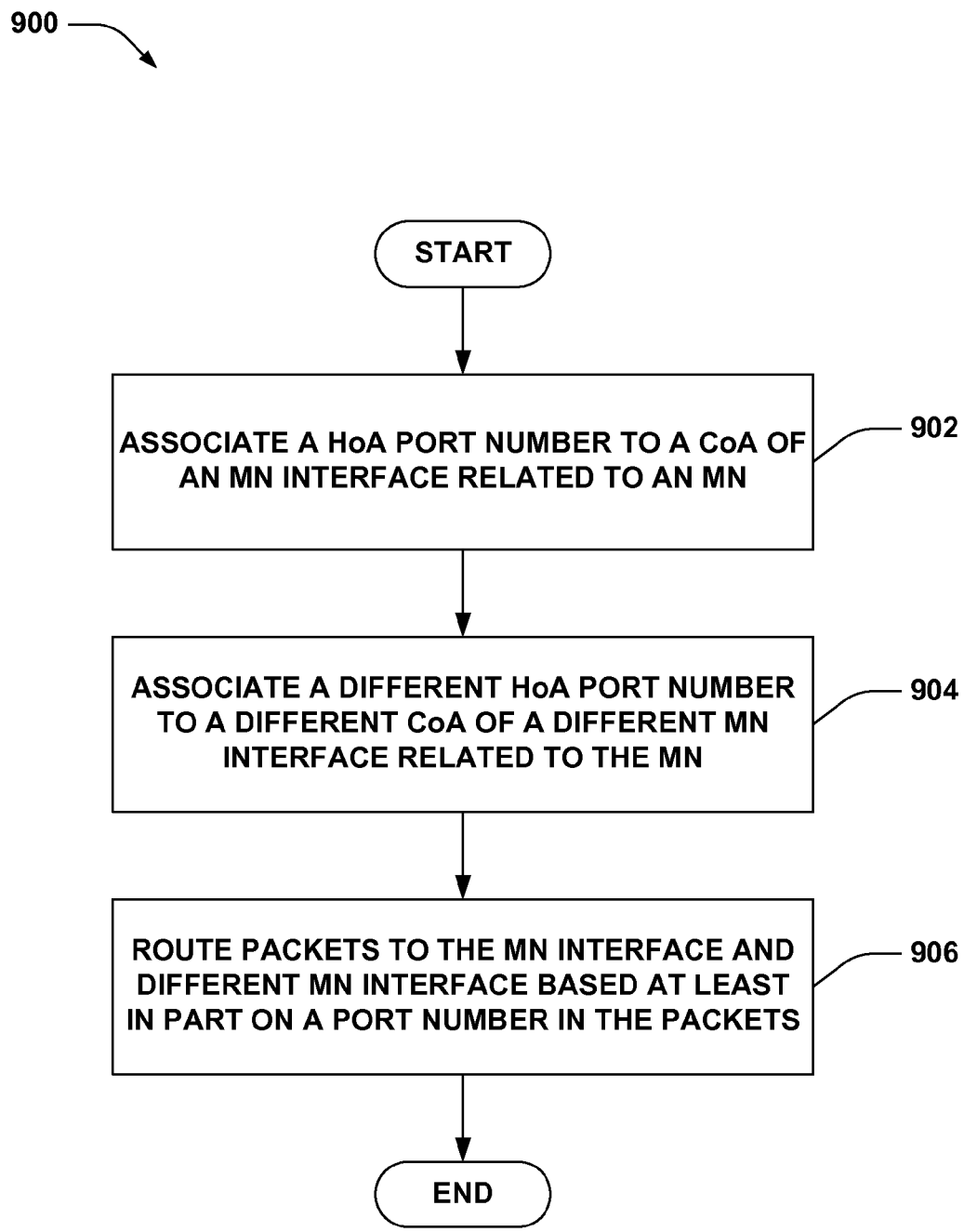
FIG. 9 illustrates an example methodology for routing packets to a MN interface based at least in part on binding parameters of sub-connections to the MN interface.

Referring to FIGS. 8-9, example methodologies relating to establishing and managing multiple sub-connections between an MN and CN are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 8, an example methodology 800 is displayed that facilitates establishing multiple sub-connections with a CN. At 802, a sub-connection can be initialized though an HA for communicating with a CN over a MN interface. As described, for example, the sub-connection can be initialized based at least in part on specifying a 5-tuple that corresponds to the sub-connection. In addition, at 804, a different sub-connection can be established through the HA for communicating with the CN over a different MN interface. This can include, for example, specifying a different 5-tuple for the different sub-connection, as described. In one example, the 5-tuples can differ in a port number related to the HoA, as described. In this regard, packets can be routed to/from the CN over the MN interface or different MN interface related to a given 5-tuple in the packets to provide multipath functionality.

Referring to FIG. 9, illustrated is an example methodology 900 that binds HoA port numbers to MN interfaces to facilitate routing packets over multiple sub-connections. At 902, a HoA port number can be associated to a CoA of an MN interface related to an MN. As described, the HoA port number can be received in a binding update from the MN, inferred from a sub-connection establishment request from the MN, and/or the like. At 904, a different HoA port number can be associated to a different CoA of a different MN interface related to the MN. Similarly, the HoA and related information can be received in a binding update. In either case, multiple sub-connections are established with the MN. At 906, packets can be routed to the MN interface and different MN interface based at least in part on a port number in the packets. Thus, as described, the port number can be matched to either the HoA port number or the different HoA port number, and the packet can be routed to the corresponding MN interface (e.g., based on a CoA associated with the HoA port number or HoA different port number association).

It will be appreciated that, in accordance with one or more aspects described herein, inferences can be made regarding determining a HoA port number, a CN port number, a number of MN interfaces and/or related sub-connections to establish or for which to request establishment, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
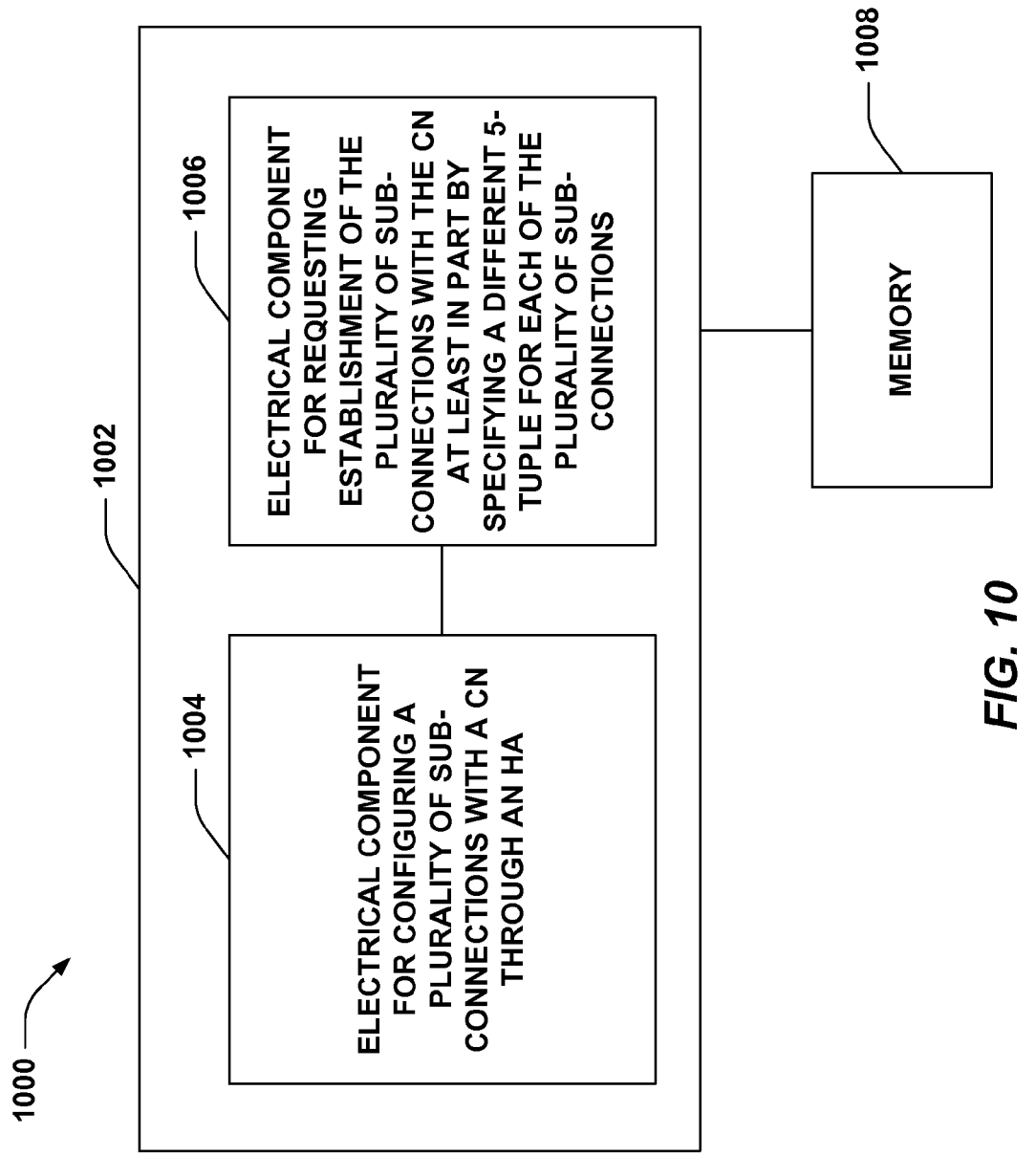
FIG. 10 illustrates an example system for establishing multiple sub-connections with a CN.

With reference to FIG. 10, illustrated is a system 1000 that facilitates establishing a plurality of sub-connections with a CN for providing multipath functionality. For example, system 1000 can reside at least partially within a MN, base station, or other device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for configuring a plurality of sub-connections with a CN through an HA 1004. For example, as described, the configuring can include generating one or more parameters for requesting establishment of the sub-connection.

For example, the one or more parameters can correspond to a 5-tuple related to the sub-connections, which can each include a source address and port (e.g., an HoA and a selected port), a destination address and port (e.g., of the CN), and/or the like. Further, logical grouping 1002 can comprise an electrical component for requesting establishment of the plurality of sub-connections with the CN at least in part by specifying a different 5-tuple for each of the plurality of sub-connections 1006. As described, for example, the 5-tuples can differ in HoA port number. Thus, the HA can differentiate between packets based on the HoA port number and can accordingly route the packets, as described, by determining an MN interface (e.g., or related CoA) correlated with the HoA port number. Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008.

Figure 11:
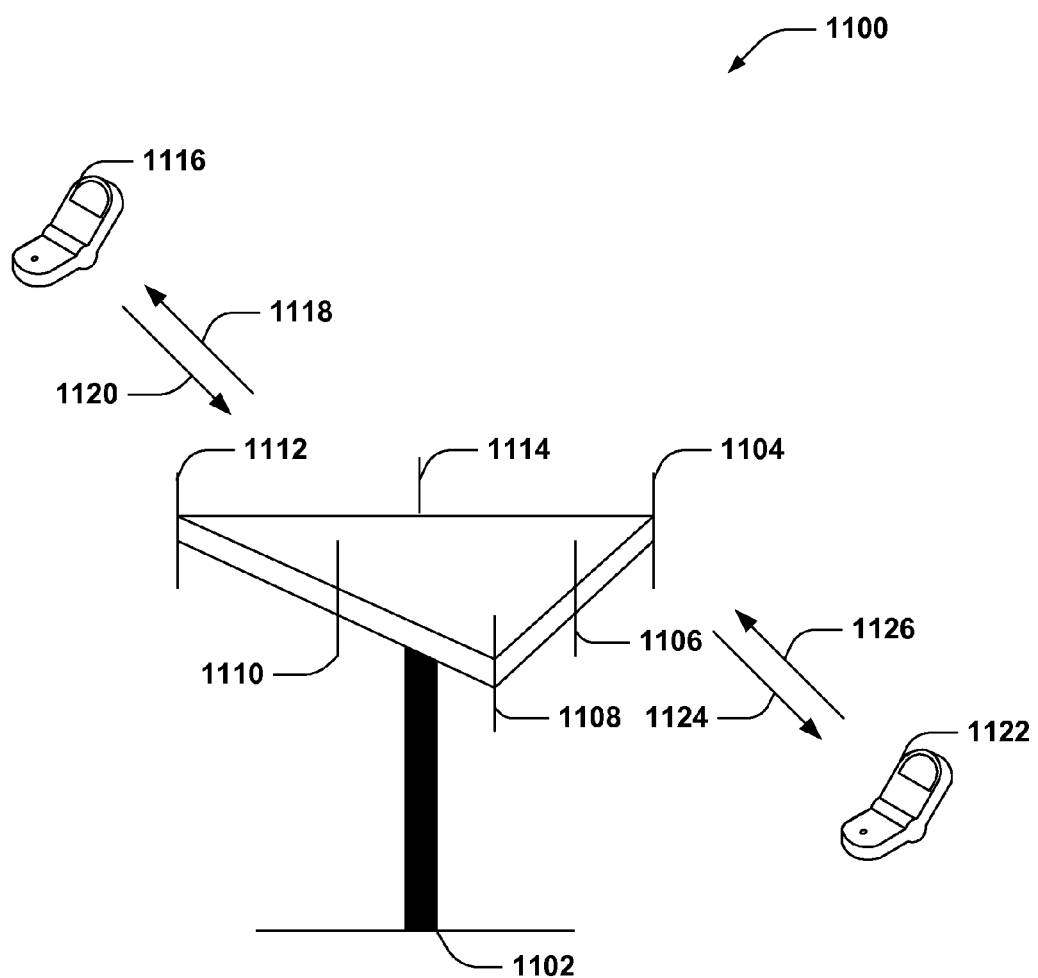
FIG. 11 is an illustration of a wireless communication system in accordance with various aspects set forth herein.

Referring now to FIG. 11, a wireless communication system 1100 is illustrated in accordance with various embodiments presented herein. System 1100 comprises a base station 1102 that can include multiple antenna groups. For example, one antenna group can include antennas 1104 and 1106, another group can comprise antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1102 can communicate with one or more mobile devices such as mobile device 1116 and mobile device 1122; however, it is to be appreciated that base station 1102 can communicate with substantially any number of mobile devices similar to mobile devices 1116 and 1122. Mobile devices 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, mobile device 1116 is in communication with antennas 1112 and 1114, where antennas 1112 and 1114 transmit information to mobile device 1116 over a forward link 1118 and receive information from mobile device 1116 over a reverse link 1120. Moreover, mobile device 1122 is in communication with antennas 1104 and 1106, where antennas 1104 and 1106 transmit information to mobile device 1122 over a forward link 1124 and receive information from mobile device 1122 over a reverse link 1126. In a frequency division duplex (FDD) system, forward link 1118 can utilize a different frequency band than that used by reverse link 1120, and forward link 1124 can employ a different frequency band than that employed by reverse link 1126, for example. Further, in a time division duplex (TDD) system, forward link 1118 and reverse link 1120 can utilize a common frequency band and forward link 1124 and reverse link 1126 can utilize a common frequency band.

Each group of antennas and/or the area in which they are designated to communicate can be referred to as a sector of base station 1102. For example, antenna groups can be designed to communicate to mobile devices in a sector of the areas covered by base station 1102. In communication over forward links 1118 and 1124, the transmitting antennas of base station 1102 can utilize beamforming to improve signal-to-noise ratio of forward links 1118 and 1124 for mobile devices 1116 and 1122. Also, while base station 1102 utilizes beamforming to transmit to mobile devices 1116 and 1122 scattered randomly through an associated coverage, mobile devices in neighboring cells can be subject to less interference as compared to a base station transmitting through a single antenna to all its mobile devices. Moreover, mobile devices 1116 and 1122 can communicate directly with one another using a peer-to-peer or ad hoc technology as depicted. According to an example, system 1100 can be a multiple-input multiple-output (MIMO) communication system.

Figure 12:
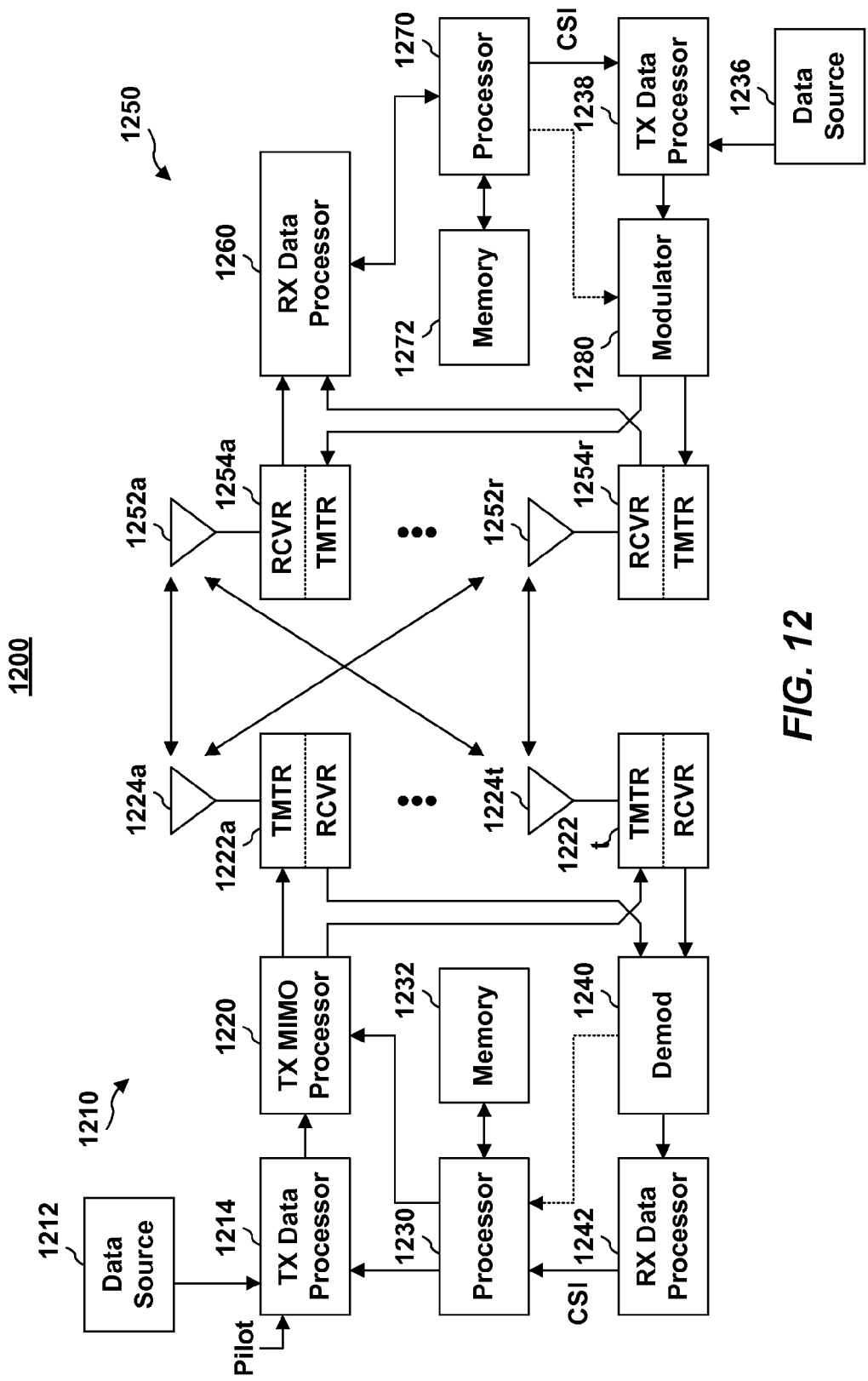
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-6 and 10-11), protocol stacks (FIG. 7), and/or methods (FIGS. 8-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides NT modulation symbol streams to NT transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1222a through 1222t are transmitted from NT antennas 1224a through 1224t, respectively.

At mobile device 1250, the transmitted modulated signals are received by NR antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the NR received symbol streams from NR receivers 1254 based on a particular receiver processing technique to provide NT "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
    initializing a sub-connection through a home agent (HA) for communicating with a correspondent node (CN) over a mobile node interface via a first network;
    signaling a number of available mobile node interfaces to the CN including at least the mobile node interface and the different mobile node interface;
    receiving a request to establish a different sub-connection from the CN in response to signaling the number of available mobile node interfaces; and
    establishing the different sub-connection through the HA for communicating with the CN over a different mobile node interface via a second network based in part on the received request, wherein the sub-connection and the different sub-connection form a multipath connection.

2. The method of claim 1, further comprising generating a different 5-tuple for the different sub-connection that varies from a 5-tuple for the sub-connection, wherein the establishing the different sub-connection is based at least in part on the different 5-tuple.

3. The method of claim 2, wherein the generating the different 5-tuple comprises utilizing a different port number in the 5-tuple that varies from a port number in the 5-tuple.

4. The method of claim 2, further comprising transmitting one or more binding updates to the HA comprising at least a portion of the 5-tuple and at least a portion of the different 5-tuple.

5. The method of claim 2, further comprising routing one or more packets over either one of the sub-connection or the different sub-connection through at least one of the mobile node interface or different mobile node interface based at least in part on identifying the 5-tuple or the different 5-tuple in the one or more packets.

6. The method of claim 1, further comprising:
    receiving a plurality of packets over the mobile node interface and a different plurality of packets over the different mobile node interface; and
    providing the plurality of packets and the different plurality of packets to an application utilizing the multipath connection.

7. A wireless communications apparatus for establishing multiple sub-connections in a mobile communication protocol, comprising:
    at least one processor configured to:
        initialize a sub-connection through a home agent (HA) for communicating with a correspondent node (CN) over a mobile node interface via a first network;
        signaling a number of available mobile node interfaces to the CN including at least the mobile node interface and the different mobile node interface;
        receive a request to establish a different sub-connection from the CN in response to signaling the number of available mobile node interfaces; and
        establish the different sub-connection through the HA for communicating with the different mobile node interface via a second network based in part on the received request, wherein the sub-connection and the different sub-connection form a multipath connection; and
    a memory coupled to the at least one processor.

8. The apparatus of claim 7, wherein the at least one processor is further configured to generate a different 5-tuple for the different sub-connection that varies from a 5-tuple for the sub-connection, wherein the establishing the different sub-connection is based at least in part on the different 5-tuple.

9. The apparatus of claim 7, wherein the at least one processor is further configured to:
    receive a plurality of packets over the mobile node interface and a different plurality of packets over the different mobile node interface; and
    provide the plurality of packets and the different plurality of packets to an application utilizing the multipath connection.

10. An apparatus for establishing multiple protocol sub-connections, comprising:
    means for obtaining a request to establish at least one of the plurality of sub-connections from a correspondent node (CN);
    means for configuring the plurality of sub-connections with the CN through a home agent;
    means for signaling a number of available mobile interfaces to the CN for receiving requests to establish at least a portion of the plurality of sub-connections means for requesting establishment of the plurality of sub-connections with the CN at least in part by specifying a different 5-tuple for each of the plurality of sub-connections; and
    means for establishing the plurality of sub-connections with the CN, wherein a sub-connection and a different sub-connection is respectively established via a first network and a second network.

11. The apparatus of claim 10, further comprising means for generating a different 5-tuple for the different sub-connection that varies from a 5-tuple for the sub-connection, wherein the establishing the different sub-connection is based at least in part on the different 5-tuple.

12. The apparatus of claim 10, further comprising:
    means for receiving a plurality of packets over the mobile node interface and a different plurality of packets over the different mobile node interface; and
    means for providing the plurality of packets and the different plurality of packets to an application utilizing the multipath connection.

13. A computer program product for establishing multiple sub-connections in a mobile communication protocol, comprising:
    a non-transitory computer-readable medium, comprising:
        code for causing at least one computer to initialize a sub-connection through a home agent (HA) for communicating with a correspondent node (CN) over a mobile node interface via a first network;
        code for causing the at least one computer to signal a number of available node interfaces to the CN including at least the mobile node interface and the different mobile node interface;
        code for causing the at least one computer to receive a request to establish a different sub-connection from the CN in response to signaling the number of available mobile node interfaces; and code for causing the at least one computer to establish the different sub-connection through the HA for communicating with the different mobile node interface via a second network based in part on the received request, wherein the sub-connection and the different sub-connection form a multipath connection.

14. The apparatus of claim 13, further comprising code for causing the at least one computer to generate a different 5-tuple for the different sub-connection that varies from a 5-tuple for the sub-connection, wherein the establishing the different sub-connection is based at least in part on the different 5-tuple.

15. The apparatus of claim 13, further comprising:

code for causing the at least one computer to receive a plurality of packets over the mobile node interface and a different plurality of packets over the different mobile node interface; and code for causing the at least one computer to provide the plurality of packets and the different plurality of packets to an application utilizing the multipath connection.

16. An apparatus for initializing multiple protocol sub-connections in a wireless network, comprising:

a sub-connection request receiving component for obtaining a request to establish at least one of a plurality of sub-connections from a correspondent node (CN);

a sub-connection configuring component for defining one or more parameters related to configuring the plurality of sub-connections with the CN through a home agent (HA);

a mobile node interface parameter specifying component that signals a number of available mobile interfaces to the CN for receiving requests to establish at least a portion of the plurality of sub-connections;

a sub-connection establishing component for requesting establishment of the plurality of sub-connections with the CN at least in part by specifying a different 5-tuple for each of the plurality of sub-connections; and a mobile interface communicating component for establishing the plurality of sub-connections with the CN, wherein a sub-connection and a different sub-connection is respectively established via a first network and a second network.

17. The apparatus of claim 16, wherein a different 5-tuple for each of the plurality of sub-connections includes a different port number related to a home address assigned by the HA for each of the plurality of sub-connections.

18. The apparatus of claim 16, wherein the sub-connection configuring component communicates one or more binding updates to the HA comprising the different 5-tuple for each of the plurality of sub-connections.

19. The apparatus of claim 16, further comprising a mobile interface communicating component for routing one or more packets over at least one of the plurality of sub-connections based at least in part on identifying the different 5-tuple related to the at least one of the plurality of sub-connections.

20. The apparatus of claim 16, further comprising a mobile node interface component for providing a plurality of packets received over at least one of the plurality of sub-connections to an application and providing a different plurality of packets received over at least a different one of the plurality of sub-connections to the application in a multipath connection.

* * * * *